United States Patent

Gavrilovic et al.

[11] Patent Number: 6,154,598
[45] Date of Patent: Nov. 28, 2000

[54] LASER COMPOSITION FOR PREVENTING PHOTO-INDUCED DAMAGE

[75] Inventors: Pavle Gavrilovic, Melrose; Anish K. Goyal, Sommerville; Hong Po, Sherborn; Shobha Singh, Weston, all of Mass.

[73] Assignee: Polaroid Corporation, Cambridge, Mass.

[21] Appl. No.: 08/995,445

[22] Filed: Dec. 22, 1997

[51] Int. Cl.$^7$ ................................. G02B 6/00; H01S 3/07
[52] U.S. Cl. ................................. 385/141; 372/6; 359/341
[58] Field of Search ................................. 385/123, 141.2; 372/6.41; 359/341

[56] References Cited

U.S. PATENT DOCUMENTS

| | | | |
|---|---|---|---|
| 4,815,079 | 3/1989 | Snitzer et al. | 372/6 |
| 5,067,134 | 11/1991 | Oomen | 372/6 |
| 5,164,953 | 11/1992 | Case et al. | 372/69 |
| 5,291,501 | 3/1994 | Hanna | 372/6 |
| 5,373,576 | 12/1994 | Minns et al. | 385/125 |
| 5,388,110 | 2/1995 | Snitzer | 72/6 |
| 5,422,897 | 6/1995 | Wyatt et al. | 372/6 |
| 5,539,758 | 7/1996 | Dennis | 372/6 |
| 5,566,196 | 10/1996 | Scrifres | 372/6 |
| 5,617,244 | 4/1997 | Percival et al. | 359/341 |
| 5,754,570 | 5/1998 | Goh | 372/6 |
| 5,939,762 | 8/1999 | Samson et al. | 359/341 |

OTHER PUBLICATIONS

Broer, M.M., Krol, D.M. and DiGiovanni, D.J., "Highly non–linear near–resonant photodarkening in a thalium–doped aluminosilicate glass fiber", *Optics Letters*, Vo. 18, No. 10, May 15, 1993, pp. 799–801.

Millar, C.A., Mallinson, S.R., Ainslie, B.J., and Craig, S.P., "Photochromic Behaviour of Thulium–Doped Silica Optical Fibers", *Electronics Letters*, vol. 24, No. 10,May 12, 1988, pp. 590–591.

Grubb, S.G., Bennett, K.W., Cannon, R.S., and Humer, W.F., *Electronics Letters*, vol.28, No. 13, pp. 1243–1244, Jun. 1992.

Brocklesby, W.S. Mathieu, A., Brown, R.S., "Defect Production in silica fibers doped with $Tm_{30}$ ", *Optics Letters*, vol. 18, Dec. 15, 1993, pp. 2105–2107.

*Primary Examiner*—John D. Lee
*Assistant Examiner*—Victoria D. Hao
*Attorney, Agent, or Firm*—Thomas P. Grodt

[57] ABSTRACT

An optical waveguide laser, preferably a fiber laser, has unintentionally incorporated impurities disposed in the lasing medium which upconvert a portion of the lasing radiation to radiation of shorter wavelength, thereby introducing defects in the medium which result in increased absorption due to photodarkening. Suitable rare-earth co-dopants are intentionally incorporated during the manufacture of the fiber for effectively shunting the upconversion process. The lifetime of the fiber laser is thereby increased.

21 Claims, 5 Drawing Sheets

LASER COMPOSITION FOR PREVENTING PHOTO-INDUCED DAMAGE

BACKGROUND OF THE INVENTION

1. Field of the Invention

This invention relates to preventing photo-induced damage, or photodarkening, to a laser material caused by unintentionally incorporated impurities. More particularly, the invention relates to preventing photodarkening in ytterbium-doped ($Yb^{3+}$) optical fiber lasers and/or waveguide structures operating at a high optical output power level and which contain thulium ($Tm^{3+}$) as an impurity. Photodarkening as a result of thulium contamination is effectively eliminated by co-doping the fiber core with other rare earth ions, preferably terbium ($Tb^{3+}$), europium ($Eu^{3+}$) and/or neodymium ($Nd^{3+}$).

2. Description of the Prior Art

There has recently been growing interest in developing continuously operating (CW) laser sources with high output power and excellent beam quality. Most state-of-the-art devices of this type employ optical crystals doped with rare earth ions, such as $Nd^{3+}$:YAG emitting at 1.06 $\mu$m, which are optically pumped either by flashlamps or, more efficiently, by semiconductor diode lasers. However, it is difficult to control the beam quality of lasers of this type over an extended output power range due to thermal instabilities and lensing effects, which result in spatial and modal instabilities of the output beam. Also, since the absorption peak of rare earth ions in crystalline host materials is rather narrow, the wavelength of the pump lasers has to be well controlled.

In order to obviate some of these disadvantages, fiber lasers doped with rare-earth ions and providing high optical lasing output powers have been developed. The geometry, in particular the waveguide characteristics of the fiber laser, advantageously overcomes some of the disadvantages mentioned above. In its simplest form, a fiber laser has a core which is doped with a rare earth ion providing a lasing transition when optically pumped, wherein the diameter of the core is preferably selected to permit either a single spatial mode (single-mode) or a controlled number of spatial modes (multi-mode) to propagate therein. The core is surrounded by a first cladding having a lower index of refraction than the core, with a second cladding surrounding the first cladding and having a lower index of refraction than the first cladding. The pump light is preferentially coupled into the first cladding either at one or both of the respective ends of the fiber laser structure, but may also be coupled in any other manner known in the art.

A high conversion efficiency from pump power to lasing output power has recently been obtained by carefully designing the geometry of the first cladding. Fiber lasers of this type are disclosed, for example, in U.S. Pat. No. 4,815,079 by E. Snitzer et al. and U.S. Pat. No. 5,533,163 by M. H. Muendel, both assigned to the applicant and incorporated herein by reference. By using a $Yb^{3+}$-doped fused silica core with a diameter of about 5 $\mu$m for supporting only a single spatial mode and a substantially rectangular first cladding with a cross section of approximately 150 $\mu$m×250 $\mu$m for receiving the pump radiation generated by laser diodes emitting at about 0.915 $\mu$m, a lasing output power in excess of 10 Watts CW, and more recently in excess of 30 Watts, was attained at a wavelength of approximately 1.1 $\mu$m. Optical sources of this type are useful, for example, for applications in printing, material processing, and for pumping other fiber lasers, such as Er-doped fiber amplifiers for telecommunication.

Due to the small diameter of the fiber core, the optical flux, i.e. the optical lasing power transmitted per unit area of the fiber core, is extremely high. Consequently, absorption effects caused, for example, by impurities disposed either on the end faces of the core or inside the core itself, can result in unwanted degradation of the device within a time frame which is substantially shorter than the lifetime required for the respective application of such lasers. It was observed experimentally by the applicants that with constant pump power, the lasing output decreased by as much as several percent during a 100 hour time period. It was furthermore observed that $Yb^{3+}$-doped fiber lasers which exhibited such a substantial decrease in optical output, also emitted blue fluorescence at a peak wavelength of approximately 470 nm. Because $Yb^{3+}$ ions have only one lasing transition, namely from the $^5F_{5/2}$ (excited level) to the $^5F_{7/2}$ (ground level) level, $Yb^{3+}$ alone cannot be responsible for the observed generation of blue emission.

In a recent paper entitled "Frequency upconversion in Tm- and Yb:Tm-doped silica fibres" by D. C. Hanna et al., Opt. Communications Vol. 70, pages 187–194 (1990), it has been reported that $Tm^{3+}$- and $Yb^{3+}$:$Tm^{3+}$-doped silica fibers pumped at a wavelength of 1.064 $\mu$m upconvert the pump radiation such as to generate blue fluorescence. Chemical and spectroscopic analysis performed on the $Yb^{3+}$-doped fiber lasers of the applicants indeed confirmed the presence of $Tm^{3+}$.

In a paper entitled "Highly nonlinear near-resonant photodarkening in a thulium-doped aluminosilicate glass fiber" by M. M. Broer et al. which was published in Optics Letters, Vol. 18, No. 10, pages 799–801 (1993), it was reported that $Tm^{3+}$-doped silicate glasses exhibit photochromism, or photodarkening. The authors further stated that the rate at which photodarkening occurs, increases with increasing "pump" power when the fiber was pumped at a wavelength of 1.064 $\mu$m. The authors postulated that multi-photon processes can raise the energy of the $Tm^{3+}$ states to approximately 40,000 $cm^{-1}$, which could result in the creation of color centers in the glass host. Color centers are known to cause optical absorption in the glass host.

Since photodarkening appears to be caused by impurity ions in the glass host, photodarkening could be prevented by using extremely pure starting materials for the manufacture of the fibers. However, the similar chemical properties and atomic masses of rare earth compounds make their purification rather difficult and expensive. This is particularly the case for $Tm^{3+}$ and $Yb^{3+}$ which occupy adjacent positions in the periodic table of the elements. Consequently, achieving a $Tm^{3+}$ concentration of less than 1 part in $10^9$ in an $Yb^{3+}$ doped fiber core may be remote. An alternate approach for preventing upconversion of lasing radiation and the optical absorption associated therewith, would be to neutralize the effect of such impurities. This could be accomplished by controllably introducing other ions into the glass host, in particular other rare earth ions, which would effectively quench or shunt, i.e. render ineffective, the upconversion process.

Co-doping of rare earth doped fibers is well known in the art. For example, in an Er-doped fiber laser co-doped with $Yb^{3+}$, pump radiation at a pump wavelength of 930 nm is absorbed by the $Yb^{3+}$ ions and subsequently transferred to the $Er^{3+}$ ions for effectively providing amplification and/or lasing through an $Er^{3+}$ transition in the wavelength range between about 1.53 $\mu$m and 1.6 $\mu$m. In U.S. Pat. No. 5,067,134 and in U.S. Pat. No. 5,617,244, there are described $Tm^{3+}$-containing fibers co-doped with other rare-earth ions, in particular with $Tb^{3+}$, for efficiently upconverting pump radiation. $Tb^{3+}$ is added to $Tm^{3+}$-containing fibers for facilitating de-excitation of electrons from the $^3F_4$ level (labeled $^3H_4$ in FIGS. 2a and 2b of the '134 patent) of $Tm^{3+}$ to the $^3H_6$ ground level, since population of the $^3F_4$ level of $Tm^{3+}$ would prevent the radiative transition from the $^1D_2$ level to the $^3F_4$ level, thereby blocking the emission of the desired 450 nm emission. The addition of $Tb^{3+}$ is thus intended to make upconversion to blue more efficient.

As mentioned before, Broer et al. observed photodarkening in thulium-doped silicate fibers exposed to 1.064 μm radiation. According to FIG. 4 in the Broer paper, the upconversion process cannot proceed if population of the $^3F_4$ level in FIG. 4 (corresponding to $^3H_4$ in the notation used by Broer) were effectively decreased by providing a de-excitation path from the $^3F_4$ level to the ground level $^3H_6$ of $Tm^{3+}$.

It is, however, apparent to those skilled in the art that de-excitation of other energetically higher levels can also quench the upconversion process. De-excitation can therefore advantageously occur at any of the numerous energy states necessary for the upconversion process.

SUMMARY OF THE INVENTION

With the foregoing in mind, it is therefore an object of the invention to provide an optical material, preferably in form of optical waveguide or optical fiber structures, wherein the lasing output power level at constant pump power is maintained constant over an extended operating period.

It is a further object of the invention to controllably reduce or eliminate photodarkening in waveguide laser structures by incorporating additional optically active centers into the lasing core which are capable of providing a de-excitation pathway for the optical centers contributing to the photodarkening effect.

It is yet another object of the invention to select the additional optically active centers from such materials, preferably rare earth atoms, which do not interact or interfere with the desired lasing and/or pumping characteristics of the waveguide laser structure.

According to the invention, the foregoing objects are attained by controllably doping the core of optical waveguide structures, preferably fiber laser structures, containing lasing ions for providing lasing transitions, and further containing an inadvertently incorporated impurity which enables upconversion of the lasing radiation to radiation with a shorter wavelength, with a further optically active center, such as a different rare earth ion, for rendering ineffective at least one of the possible upconversion paths provided by the inadvertently incorporated impurity.

In a first embodiment of the invention, an optical waveguide, preferably an optical glass (silicate) fiber, comprises a single core or multiple cores, with each core having a diameter of preferably 5 μm for single-mode emission and doped with the lasing ion, for example $Yb^{3+}$, to provide lasing output at, for example, a wavelength of about 1.1 μm. The core may also contain an impurity, such as $Tm^{3+}$, inadvertently incorporated during the manufacture of the fiber preform. The fiber preform is made, for example, by the modified chemical vapor deposition (MCVD) process or any other process, such as solution doping, known in the art. The fiber core is surrounded by a first cladding layer having a cross sectional area which is preferably substantially larger than the cross sectional area of the core, and an index of refraction which is smaller than the index of refraction of the core. The first cladding layer can be adapted to receive pump radiation from a pump source, preferentially a semiconductor laser emitting at an absorption wavelength of the lasing ion in the core which in the present example is $Yb^{3+}$ with a strong absorption at about 915 nm. The form or shape of the first cladding is not important for the present invention. The first cladding is preferably surrounded by a second cladding having an index of refraction which is smaller than the index of refraction of the first cladding for confining the pump radiation to the first cladding and the core.

The pump light propagating in the first cladding is absorbed by the lasing ions disposed in the core, e.g. $Yb^{3+}$, and converted to lasing radiation, in the present example having a wavelength of about 1.1 μm, in a manner discussed, for example, in U.S. Pat. No. 4,815,079. The impurity ion, e.g. $Tm^{3+}$, has electronic states close in energy to the lasing radiation, thereby absorbing the lasing radiation and exciting the impurity ion to a first excited level. The impurity ion can then be excited to energetically higher levels by absorbing additional lasing, pump, or fluorescent radiation energy if the energy separation between those levels corresponds to any of these radiation energies. Additional non-radiative transitions may also take place, but such non-radiative transitions are not important for the present discussion. When the dopant ions are excited to higher energies, in particular to energies close to the bandgap of the silicate glass fiber, defects, such as color centers, can be introduced in the core host material which can then result in increased optical absorption along the length of the fiber.

By co-doping the fiber core with additional, but different dopant ions, for example $Tb^{3+}$, having energy levels capable of electronically or optically de-exciting the impurity ions from their respective excited level or levels, upconversion and damage to the host material associated therewith can be effectively eliminated.

Other objects and attainments together with a fuller understanding of the invention will become apparent and appreciated by referring to the following description and claims taken in conjunction with the accompanying drawings.

BRIEF DESCRIPTION OF THE DRAWINGS

In the following Figures, like parts or components and/or like functions of parts or components are referenced with the same numerals, and not all numerals are shown on all figures for sake of clarity.

In the drawing is shown in.

DETAILED DESCRIPTION

The energy levels of trivalent rare-earth ions in crystalline host materials, such as $LaCl_3$, are shown, for example, in FIG. 1.1 on page 10 of the book by Alexander A. Kaminsidi, *Laser Crystals, Springer-Verlag: New York, Springer Series in Optical Sciences, Ed.: H. K Lotsch,* 1990.

It is well known in the art that the energy levels do not vary significantly from one type of host crystal to another.

The energy levels in a host made from glass differ from those in a crystalline host in that the energy levels in glasses are broadened significantly as a result of the absence of long-range order, as is also well known in the art.

For commercial applications, such as materials processing, $Nd^{3+}$:YAG lasers emitting at about 1.06 μm are most widely used. These lasers are commonly pumped at a wavelength of about 807 nm where $Nd^{3+}$ exhibits strong absorption. The 807 nm pump radiation is then converted in the lasing medium, most commonly $Nd^{3+}$:YAG, into the 1.06 μm lasing radiation. The energy conversion efficiency of these lasers is impaired, among others, by the fact that the energy difference between the 807 nm pump radiation and the 1.06 μm lasing radiation is lost in form of heat. It is therefore advantageous to employ a different rare earth lasing atom having energy levels where the energy difference between the pump radiation and the lasing radiation is smaller. A suitable atom of this type is $Yb^{3+}$.

Figure 1:
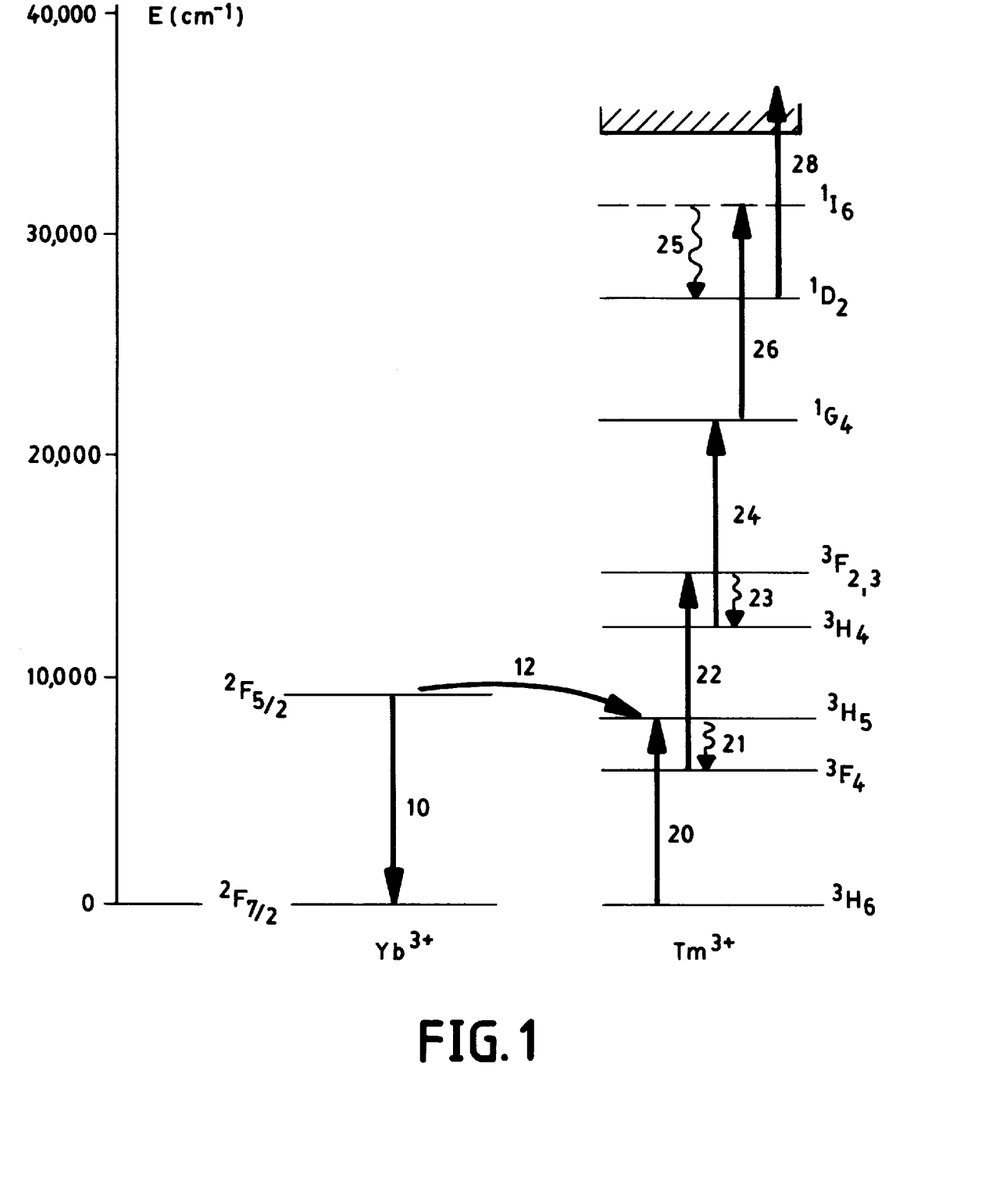
FIG. 1 the energy level diagram of $Yb^{3+}$ and of $Tm^{3+}$ in silica glass indicating various absorption and emission paths, FIG. 2 optical emission spectrum of an $Yb^{3+}$-doped fiber laser containing unintentionally introduced $Tm^{3+}$, FIG. 3 schematically, a possible energy transfer path for de-exciting $Tm^{3+}$ in silica glass co-doped with $Tb^{3+}$, FIG. 4 schematically, a possible energy transfer path for de-exciting $Tm^{3+}$ in silica glass co-doped with $Eu^{3+}$, and FIG. 5 schematically, a possible energy transfer path for de-exciting $Tm^{3+}$ in silica glass co-doped with $Nd^{3+}$.

Referring now to FIG. 1, there is shown on the left side of the figure the energy level diagram of $Yb^{3+}$ which is quite simple. Although $Yb^{3+}$ is essentially a two-level system, as seen from FIG. 1, and thus does not appear to be capable of generating efficient lasing operation, the excited level $^2F_{5/2}$ and the ground level $^2F_{7/2}$ in glass host materials are sufficiently broadened such as to effectively function as a four-level system, much like $Nd^{3+}$. The lasing emission wavelength is about 1.1 μm, with a pump wavelength of about 915 nm. The efficiency of $Yb^{3+}$-doped lasers is higher that that of $Nd^{3+}$-doped lasers as a result of the smaller difference between pump wavelength and lasing wavelength in $Yb^{3+}$-doped lasers, as mentioned above.

A listing and detailed description of other rare-earth ions suitable for lasing operation in glasses can be found, for example, in the article by J. S. Sanghera et al. in *Rare Earth Doped Fibers and Amplifiers*, ed. by M. J. F. Digonnet, pp. 423–496, published by Marcel Dekker Inc. (1991).

As mentioned above, rare-earth starting materials employed in the manufacture of optical fibers are difficult to purify due to their similar chemical properties and atomic mass. Not surprisingly, traces of other rare-earth ions, such as $Tm^{3+}$, are frequently found in the lasing core in addition to the lasing ions. Referring now again to FIG. 2, there are illustrated the electronic states of $Tm^{3+}$ in relation to those of $Yb^{3+}$. It should be noted that the energy levels in the energy level diagram of $Tm^{3+}$ depicted in FIG. 1 are frequently depicted differently in the literature in that the $^3F_4$ and the $^3H_4$ levels are interchanged. In the following, the order of the energy levels will following the nomenclature of M. L. Dennis in U.S. Pat. No. 5,539,758.

Lasing radiation at a wavelength of about 1.1 μm is generated in the core of a fiber doped with $Yb^{3+}$ by transition 10. The presence of $Tm^{3+}$ causes the 1.1 μm lasing radiation to be absorbed by the $Tm^{3+}$ ions by exciting $Tm^{3+}$ from the $^3H_6$ ground level to the $^3H_5$ excited level via transition 20. From the $^3H_5$ excited level, $Tm^{3+}$ relaxes non-radiatively via transition 21 to the $^3F_4$ level, from where $Tm^{3+}$ undergoes a further transition 22 to the $^3F_{2,3}$ levels by absorbing additional 1.1 μm lasing radiation. Again, after non-radiative relaxation from the $^3F_3$ level to the $^3H_4$ level via path 23, the $Tm^{3+}$ ion can undergo a further transition 24 to the $^1G_4$ level, again through absorption of additional 1.1 μm lasing radiation. From the $^1G_4$ level, $Tm^{3+}$ can then decay radiatively to the $^3H_6$ ground level through emission of a photon with a wavelength of about 470 nm or can absorb additional 1.01 μm lasing radiation via transitions 26 and 28, thereby exciting the $Tm^{3+}$ ions all the way to the bandgap of the host glass. Those skilled in the art will appreciate that the pump radiation at about 915 nm can also contribute to the upconversion process.

Figure 2:
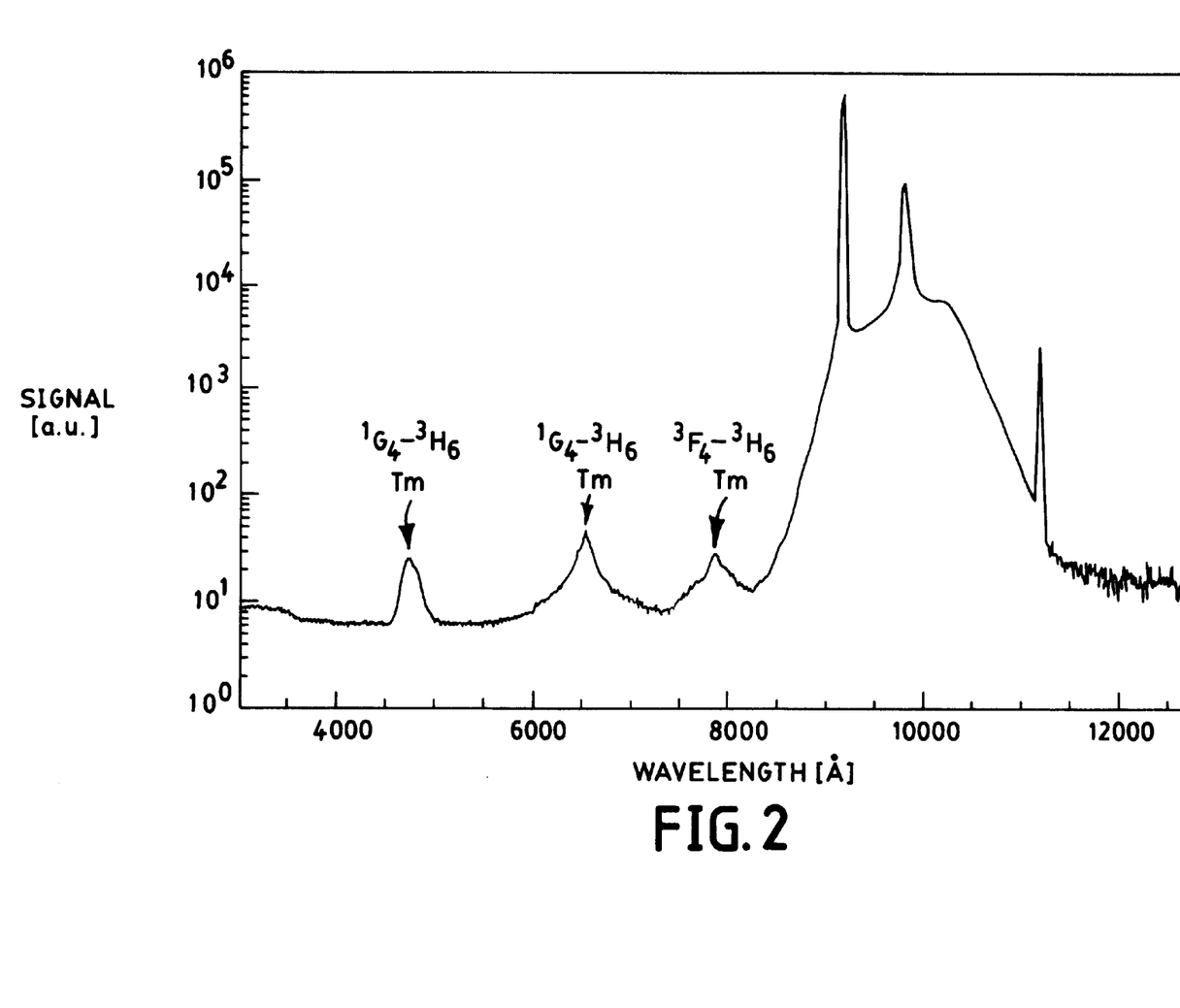

Referring now to FIG. 2, there are shown optical fluorescence emission peaks which have been observed in $Yb^{3+}$-doped fiber lasers. These peaks have been labeled such as to indicate their correspondence to the aforedescribed three-step upconversion of the 1.1 μm lasing radiation by the $Tm^{3+}$ atoms. In the measured emission spectrum of FIG. 2, the peak at a wavelength of about 470 nm is due to the $^1G_4=>^3H_6$ transition in $Tm^{3+}$, the peak at a wavelength of about 650 nm to the $^3F_3=>^3H_6$ transition or the $^1G_4=>^3F_4$ transition in $Tm^{3+}$, and the peak at a wavelength of about 780 nm is due to the $^3H_4=>^3H_6$ transition in $Tm^{3+}$.

Without wishing to be bound by theory, it appears that the process by which photodarkening is produced, is related to the creation of color centers in the host glass. Consequently, such color centers can be created as a result of the upconversion of the 1.1 μm lasing radiation by $Tm^{3+}$ as described. At least in the present embodiment having $Yb^{3+}$ lasing ions, a significant upconversion pathway generating color centers appears to be the excitation of $Tm^{3+}$ to the $^1G_4$ level which generates the fluorescence at about 470 nm upon direct de-excitation to the ground state $^3H_6$. For example, once $Tm^{3+}$ ions are excited to this level, these excited atoms can exchange energy through electronic cross-relaxation, thereby exciting an already excited $Tm^{3+}$ into the "bandgap" and forming a color center defect. Alternatively, energy transfer may also occur by way of direct optical absorption rather than cross-relaxation which would require a much lower concentration of $Tm^{3+}$ ions in the fiber. It will be understood that the choice of $Tm^{3+}$ for illustrating the effect of photodarkening in optical materials, in particular in fiber lasers, is intended merely as an example, and that similar arguments apply to other rare earth ions capable of producing photodarkening, such as for example $Ho^{3+}$ and $Er^{3+}$.

These observations suggest that photodarkening in fibers which inadvertently contain, for example, $Tm^{3+}$, or other rare earth ions causing photodarkening, could be effectively prevented by co-doping these fibers with a second species of rare earth dopants which renders ineffective the upconversion path of, for example, $Tm^{3+}$. Preferably, a suitable co-dopant has energy levels with do not interfere with either the $Yb^{3+}$ lasing radiation at 1.1 μm (~9,000 $cm^{-1}$) or with the pump radiation with a wavelength of 915–930 nm (~11,000 $cm^{-1}$). As seen from a diagram of the energy levels of the rare earth atom, which is depicted, as mentioned above, in FIG. 1.1 of the book by Alexander A. Kaminskii, *Laser Crystals, Springer-Verlag:New York, Springer Series in Optical Sciences, Ed.: H. K. Lotsch,* 1990, likely co-dopants thus are $Ce^{3+}$, $Nd^{3+}$, $Pm^{3+}$, $Eu^{3+}$, $Gd^{3+}$ and $Th^{3+}$. Moreover, suitable co-dopants should also have energy levels which overlap with those excited states of $Tm^{3+}$ which contribute to the upconversion process when exposed to 1.1 μm lasing radiation. As mentioned before, a suitable co-dopant preferably also absorbs the blue fluorescence emission, such as the emission originating from the $^1G_4=>^3H_6$. For this specific case of $Tm^{3+}$ contamination in a $Yb^{3+}$-doped fiber laser, this restricts suitable co-dopants to $Nd^{3+}$, $Pm^{3+}$, $Eu^{3+}$ and $Tb^{3+}$. Of these candidates, $Pm^{3+}$ should be ruled out because of its radioactive nature.

Figure 3:
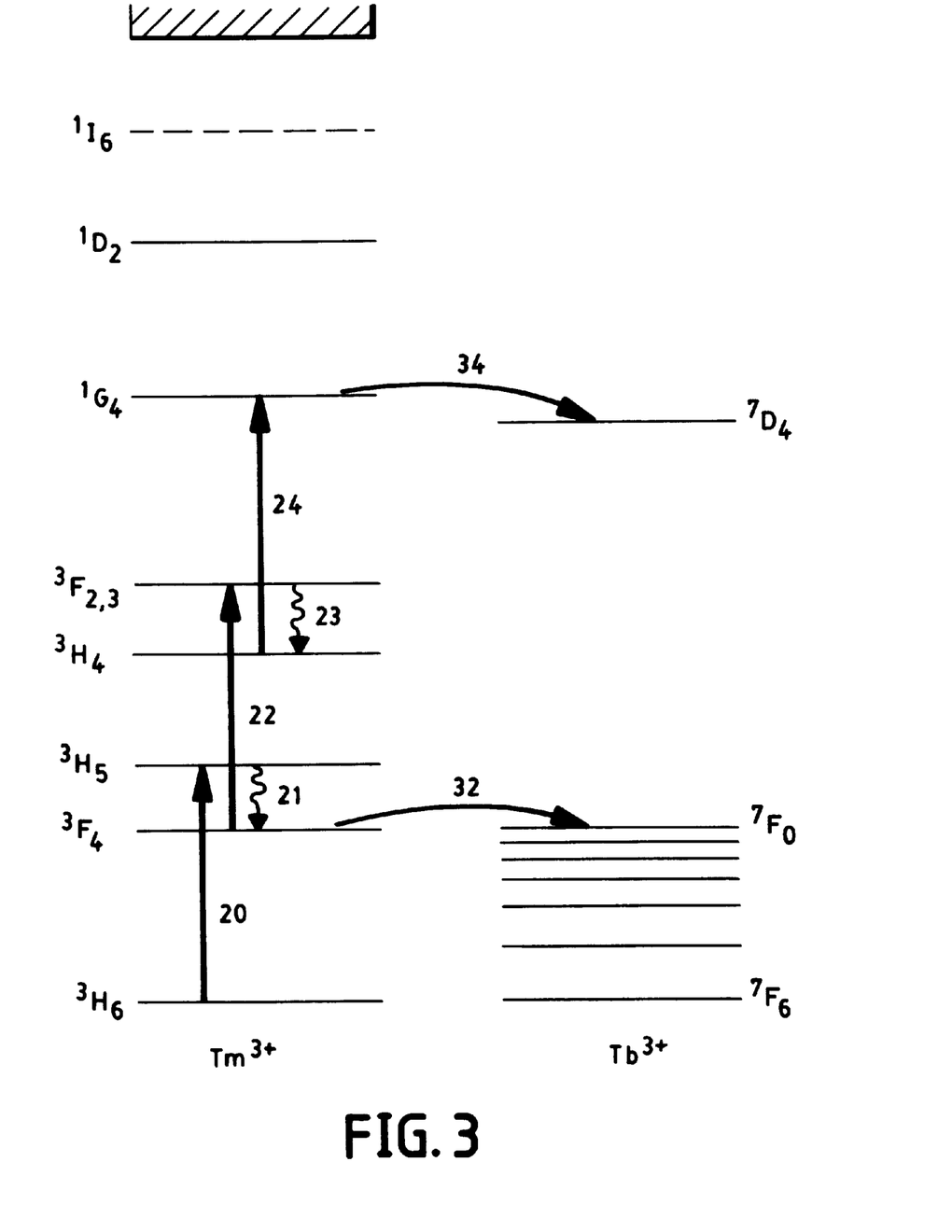

In a preferred embodiment depicted in FIG. 3, there are shown the energy levels of an $Yb^{3+}$-doped fiber laser core containing $Tm^{3+}$ as an impurity wherein the fiber core is intentionally co-doped with $Tb^{3+}$ for the purpose of preventing upconversion. Shown schematically are proposed path for "de-exciting" the $Tm^{3+}$ ions, in particular the paths 32 and 34 for transferring energy from the long-lived $^3F_4$ level of $Tm^{3+}$ to the $^7F_0, \ldots, ^7F_6$ multiplet states $Tb^{3+}$. If, as mentioned above, a $Tb^{3+}$ ion is disposed in the host materials, i.e. glass, sufficiently proximate to an excited $Tm^{3+}$ ion, then such energy transfer becomes highly probable. Once this energy transfer occurs, the $Tb^{3+}$ ion will experience a fast de-excitation to the ground level due to the close spacing of the $^4F$ levels $^7F_0, \ldots, ^7F_6$ and the short radiation lifetime of these levels. As a result, the upconversion process in $Tm^{3+}$—via the steps 20, 22, 24, 26, 28—is "shunted", since the upconversion steps 20 ($^3H_6 => ^3H_5$), 22 ($^3F_4 => ^3F_2$) and 24 ($^3H_4 => ^1G_4$) are sequential and require the population of the $^3F_4$ level of $Tm^{3+}$. The use of $Tb^{3+}$ is particularly attractive since the next highest energy level of $Tb^{3+}$ above the $^7F_0$ level is located at an energy of approximately 20,000 $cm^{-1}$ and is therefore transparent to both the lasing and pump radiation. As already mentioned above, $Tb^{3+}$ also aids in the de-excitation of these higher lying $^1D_2$ and $^1G_4$ levels of $Tm^3$.

If the energy transfer between the $Tm^{3+}$ and the $Tb^{3+}$ ions is the result of electronic dipole interactions, then a relatively high co-dopant concentration is required. The $Tb^{3+}$ ions would then have to be separated from the $Tm^{3+}$ ions by less than the so-called "screening radius" which is several Angstroms to several tens of Angstroms, depending on the electronic and dielectric properties of the host material. For this reason, the $Th^{3+}$ concentration is then preferably at least 10 times higher than the $Tm^{3+}$ concentration. If, as already mentioned above, de-excitation takes place optically, i.e. via absorption of optical radiation emitted by the excited impurity ion, then the concentration of the de-exciting ions could be substantially lower. The applicants do not wish to limit the scope of the invention by being restricted to any of the possible aforedescribed mechanisms.

Experimentally, fibers began to exhibit blue luminescence at a $Tm^{3+}$ concentration of between 1 and 10 parts in $10^9$ ($10^{-9}$-$10^{-8}$) by weight, corresponding to about $5-50 \times 10^{16}$ ions/$cm^3$. Most preferably, the $Tb^{3+}$ concentration should be at least about 100 times higher than the $Tm^{3+}$ concentration for efficiently de-exciting the $^3F_4$ level of $Tm^{3+}$.

Figure 4:
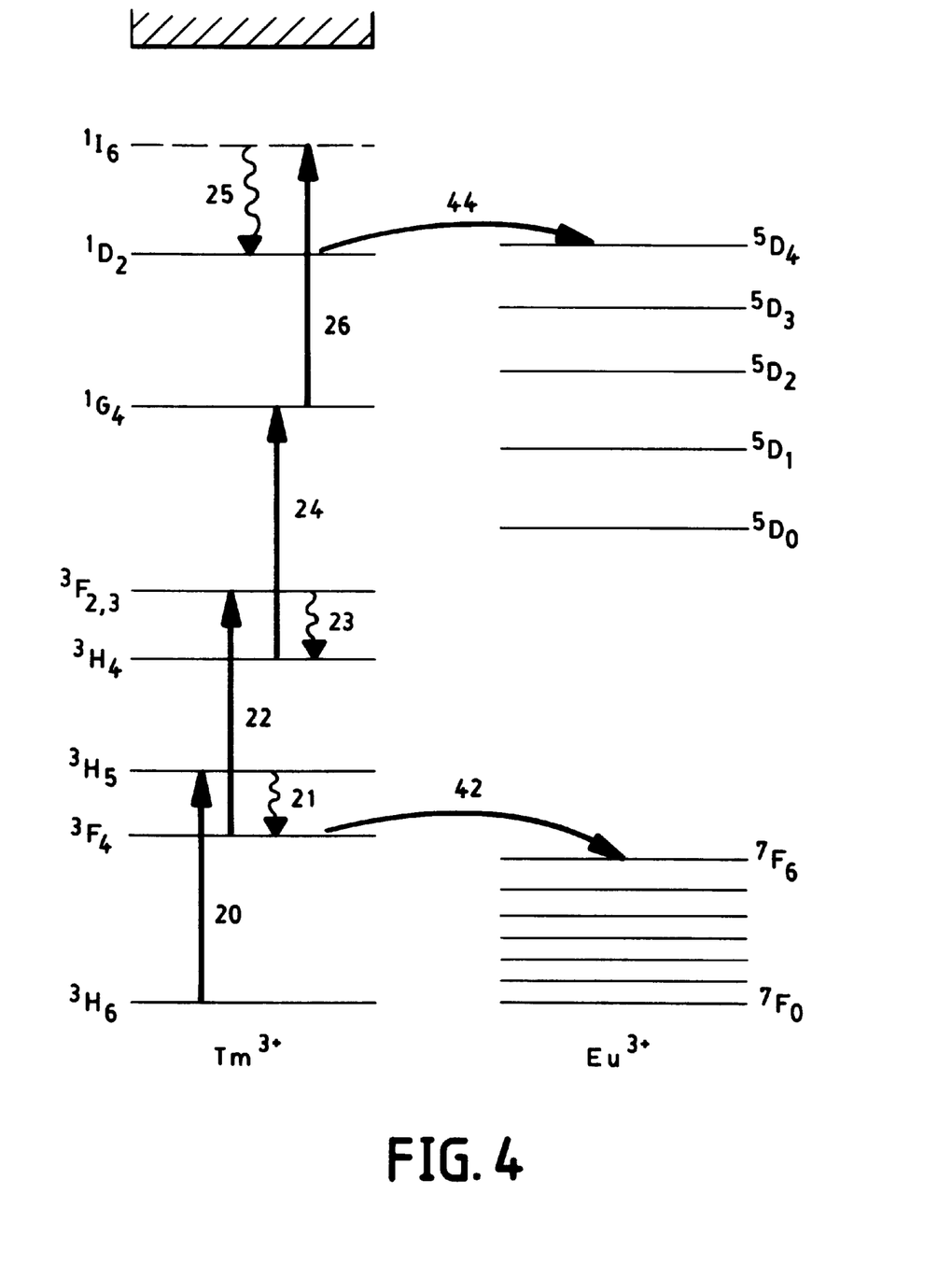

In another preferred embodiment of the invention which is illustrated in FIG. 4, $Eu^{3+}$ is incorporated into the fiber core as the co-dopant of choice for de-exciting the $^3F_4$ level of $Tm^{3+}$. As is apparent from FIG. 4, the $^7F_6$ level of $Eu^{3+}$ overlaps with the $^3F_4$ level of $Tm^{3+}$. As mentioned above, there are no excited states of $Eu^{3+}$ which are equal in energy to and thus are capable of absorbing the 1.1 $\mu$m lasing radiation. However, there exist excited states of $Eu^{3+}$ located at approximately the same energy as the $^1D_2$ and $^1G_4$ excited level of $Tm^{3+}$ which may advantageously provide an additional de-excitation path for the $Tm^{3+}$ ions in the same fashion as described above for $Th^{3+}$.

Figure 5:
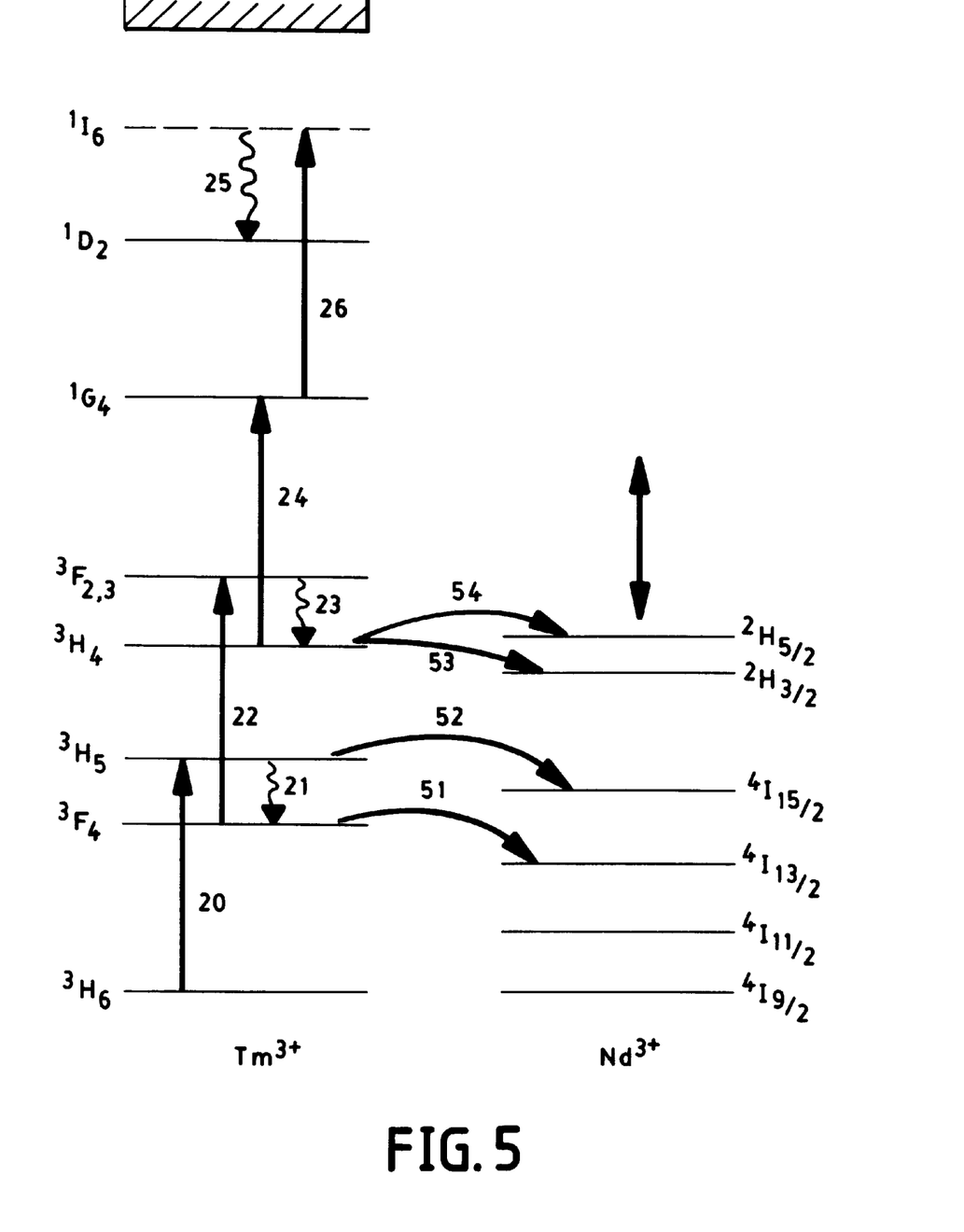

Referring now to FIG. 5, there is depicted still another embodiment wherein $Nd^{3+}$ is used as a co-dopant instead of or in addition to $Tb^{3+}$ and/or $Eu^{3+}$. The $^4H_{3/2} => ^4I_{11/2}$ lasing transition of $Nd^{3+}$ does not absorb the 1.1 $\mu$m lasing radiation of $Yb^{3+}$ since this absorption would involve exciting the $Nd^{3+}$ ions from the $^4I_{11/2}$ level to the $^4H_{3/2}$ level. The $^4I_{11/2}$ level, however, is an excited state which is not populated in equilibrium. It is, however, apparent that $Nd^{3+}$ can be effective for de-exciting the $^3F_4$, $^3H_5$ and $^3H_4$ levels of $Tm^{3+}$ via transitions 51, 52, 53 and 54, respectively, and also the higher energy levels, such as the $^1G_4$, $^1D_2$ and $^1I_6$ levels, by energy transfer between $Tm^{3+}$ While there have been described what at present are considered to be the preferred embodiments of the present invention, it will be readily apparent to those skilled in the art that various changes may be made therein without departing from the invention, and it is intended in the claims to cover such changes and modifications as fall within the true spirit and scope of the invention.

What is claimed is:

1. An optical medium having propagating therein an intense beam of optical radiation of a first wavelength, the medium containing a plurality of first dopant atoms having a ground state and plurality of excited state levels spaced apart in energy from the ground state such as to be capable of absorbing at least a portion of said optical radiation, said absorbed optical radiation raising a first portion of said first dopant atoms from the ground state to a first excited state and subsequently raising a second portion of said dopant atoms from substantially said first excited state to a second excited state having an energy relative to the ground state of substantially twice the energy of the absorbed optical radiation, the medium further comprising:

a plurality of second dopant atoms, said second dopant atoms having a ground state and at least one excited state spaced apart in energy from the ground state such as to be substantially transparent to said first wavelength, said at least one excited state of the second dopant atoms having an energy level substantially equal to the energy level of at least one of the excited states of the first dopant atoms, wherein said first dopant atoms are de-excited by transferring energy from said at least one excited state of said first dopant atoms to the at least one excited state of the second dopant atoms having an energy state substantially equal to the energy level of said at least one of the excited states of the first dopant atoms, thereby reducing the number of first dopant atoms in the at least one excited state of said first dopant atom.

2. The optical medium of claim 1, wherein said second portion of said first dopant atoms relaxes to an energy level lower in energy than said at least one excited state of the first dopant before being raised by said optical radiation to a second excited state of the first dopant.

3. The optical medium of claim 1 further comprising a plurality of lasing atoms having energy levels capable of generating the intense beam of optical radiation of the first wavelength in response to pump radiation from an external optical pump source.

4. The optical medium of claim 3, wherein said lasing atoms comprises rare earth atoms selected from the group consisting of $Nd^{3+}$ and $Yb^{3+}$.

5. The optical medium of claim 1, wherein said first dopant atom comprise rare earth atoms selected from the group consisting of $Tm^{3+}$, $Ho^{3+}$ and $Er^{3+}$.

6. The optical medium of claim 1, wherein said second dopant atoms comprise rare earth ions selected from the group consisting of $Nd^{3+}$, $Tb^{3+}$ and $Eu^{3+}$.

7. The optical medium of claim 1, wherein said first wavelength is substantially in the range of between 0.9 $\mu$m and 1.2 $\mu$m.

8. An optical waveguide comprising:

a core having an index of refraction n1 and comprising a lasing medium, said core disposed in a cladding having an index of refraction n2 which is smaller than the index of refraction n1;

said lasing medium having disposed therein a plurality of lasing dopant atoms for generating lasing radiation having a lasing wavelength characteristic of lasing transitions between electronic states of said lasing atoms, said lasing radiation generated in response to absorption of pump radiation from an external optical pump source;

said lasing medium farther comprising a plurality of first dopant atoms having a ground state and plurality of energy levels spaced apart in energy from the ground state such as to be capable of absorbing at least a portion of said lasing radiation, said absorbed lasing radiation raising a first portion of said first dopant atoms from the ground state to a first energy level of said first dopant atom and subsequently raising a second portion of said dopant atoms from substantially said first energy level to a second energy level of said first dopant atom having an energy relative to the ground state of substantially twice the energy of the absorbed lasing radiation, the lasing medium further comprising:

a plurality of second dopant atoms, said second dopant atoms having a ground state and at least one energy level spaced apart in energy from the ground state such as to be substantially transparent to at least one of the optical radiation at said first wavelength and the pump radiation, said at least one energy level of the second dopant atoms having an energy substantially equal to the first energy level of the first dopant atoms, wherein said first portion of the first dopant atoms in said first energy level of said first dopant atoms is transferred at least partially to the at least one spaced apart energy level of the second dopant atoms having an energy state substantially equal to said energy level of at least one of the excited states of the first dopant atoms and subsequently transitions to the ground state, thereby reducing the number of first dopant atoms in the first energy level of said first dopant atom capable of being raised by said optical radiation to said second energy level of said first dopant atom.

9. The optical waveguide of claim 8, wherein said optical waveguide is an optical fiber.

10. The optical waveguide of claim 8, further comprising a further cladding having an index of refraction $n_3$ and surrounding said cladding, wherein $n_2 > n_3$.

11. The optical waveguide of claim 8, wherein said lasing atoms comprises rare earth atoms selected from the group consisting of $Nd^{3+}$ and $yb^{3+}$.

12. The optical waveguide of claim 11, wherein said lasing atoms have a concentration substantially in the range of $0.5 \times 10^{20}$ atoms/cm$^3$ to $5 \times 10^{20}$ atoms/cm$^3$.

13. The optical waveguide of claim 8, wherein said first dopant atom comprise rare earth atoms selected from the group consisting of $Tm^{3+}$, $Ho^{3+}$ and $Er^{3+}$.

14. The optical waveguide of claim 8, wherein said second dopant atoms comprise rare earth atoms selected from the group consisting of $Nd^{3+}$, $Tb^{3+}$ and $Eu^{3+}$.

15. The optical waveguide of claim 14, wherein said second dopant atoms have a concentration substantially in the range of $1 \times 10^{16}$ atoms/cm$^3$ to $5 \times 10^{20}$ atoms/cm$^3$.

16. The optical waveguide of claim 8, wherein said lasing radiation has a wavelength substantially in the range of between 0.9 $\mu$m and 1.2 $\mu$m.

17. The optical waveguide of claim 8, wherein said pump radiation has a wavelength substantially in the range of 0.8 $\mu$m to 1.0 $\mu$m.

18. An optical medium having propagating therein an intense beam of optical radiation of a first wavelength and comprising first dopant atoms having excited energy states, said radiation capable of undergoing upconversion to wavelengths shorter than said first wavelength through excitation of said first dopant atoms to at least one of said excited states by said optical radiation, said medium further comprising second dopant atoms having excited energy states, said second dopant atoms capable of receiving energy at an excited energy level from at least one of excited energy states of said first dopant atoms and capable of de-exciting at least one of said excited energy states of said first dopant atom, thereby effectively shunting the upconversion.

19. Method for preventing upconversion of lasing or pump radiation in optical fiber lasers having a lasing core with an index of refraction n, disposed in a cladding surrounding said core and having an index of refraction n2, wherein n,>n2, said fiber lasers converting pump radiation into lasing radiation, said upconversion caused by optical transitions to excited states of first dopant atoms present in at least one of said lasing core or cladding, the method comprising doping at least one of the lasing core or cladding with a second dopant atom having excited energy states, said second dopant atoms capable of receiving energy at an excited energy level from at least one of excited energy states of said first dopant atoms and capable of deexciting the excited states of the first dopant atoms such as to effectively shunting said upconversion.

20. The method of claim 19, wherein said first dopant atom comprise rare earth atoms selected from the group consisting of $Tm^{3+}$, $Ho^{3+}$ and $Er^{3+}$.

21. The method of claim 19, wherein said second dopant atoms comprise rare earth atoms selected from the group consisting of $Nd^{3+}$, $Tb^{3+}$ and $Eu^{3+}$.

* * * * *